United States Patent
Haight et al.

(10) Patent No.: US 8,117,847 B2
(45) Date of Patent: Feb. 21, 2012

(54) HYBRID MISSILE PROPULSION SYSTEM WITH RECONFIGURABLE MULTINOZZLE GRID

(75) Inventors: Stephen D. Haight, Tucson, AZ (US); Daniel Chasman, Tucson, AZ (US); Juan A. Perez, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1020 days.

(21) Appl. No.: 12/044,227

(22) Filed: Mar. 7, 2008

(65) Prior Publication Data

US 2009/0229241 A1  Sep. 17, 2009

(51) Int. Cl.
*F02K 1/00* (2006.01)

(52) U.S. Cl. .............. 60/771; 60/770; 60/767; 60/253

(58) Field of Classification Search .............. 60/767, 60/770, 771, 253, 245, 224, 225
See application file for complete search history.

(56) References Cited

U.S. PATENT DOCUMENTS

| | | | |
|---|---|---|---|
| 2,613,497 A | 10/1952 | Macdonald | |
| 2,684,570 A | 7/1954 | Nordfors | |
| 2,684,629 A | 7/1954 | Nordfors | |
| 2,760,371 A | 8/1956 | Borden | |
| 2,799,987 A | 7/1957 | Chandler | |
| 2,912,820 A | 11/1959 | Whitmore | |
| 2,933,889 A * | 4/1960 | Tolkmitt | 239/265.27 |
| 2,933,899 A | 4/1960 | Cobi | |
| 2,967,393 A | 1/1961 | Von Broun | |
| 3,038,305 A | 6/1962 | Price | |
| 3,046,736 A | 7/1962 | Thomson | |
| 3,052,090 A | 9/1962 | Herzog | |
| 3,097,482 A | 7/1963 | Lovingham | |
| 3,115,747 A | 12/1963 | Yu | |
| 3,115,767 A | 12/1963 | Tyrrell et al. | |
| 3,147,591 A | 9/1964 | McEwen | |
| 3,221,496 A | 12/1965 | Haak | |
| 3,420,060 A | 1/1969 | Ostroff et al. | |

(Continued)

FOREIGN PATENT DOCUMENTS

DE  1153657  8/1963

(Continued)

OTHER PUBLICATIONS

D.B. Saharon, "Turbulence Effect on Crossflow Around a Circular Cylinder at Subcritical Reynolds Numbers", Master Thesis, Colorado State University, Ft. Collins, Colorado, Mar. 1982.

*Primary Examiner* — Ehud Gartenberg
*Assistant Examiner* — Andrew Nguyen
(74) *Attorney, Agent, or Firm* — Renner, Otto, Boisselle & Sklar, LLP (57) ABSTRACT

A propulsion system, such as for use in a missile, includes a multinozzle grid having a pair of plates that are separably mechanically coupled together. When coupled together in a first configuration, the plates provide multiple nozzles in a first nozzle configuration (geometry). Separation of the plates, such as by separating an aft plate from a forward plate that remains with the missile, reconfigures the multinozzle grid to a second configuration that has nozzles in a second nozzle configuration (geometry). The nozzle configurations may be suitable for different types of propulsion mechanisms. The hybrid propulsion system utilizing the multinozzle grid may include a pair of pressurized gas sources, for example a solid rocket fuel and a combustion chamber for a ramjet.

18 Claims, 9 Drawing Sheets

U.S. PATENT DOCUMENTS

| | | | |
|---|---|---|---|
| 3,433,265 A | 3/1969 | Bartholet | |
| 3,535,881 A | 10/1970 | Schubert | |
| 3,650,348 A | 3/1972 | Colebrook et al. | |
| 3,768,257 A * | 10/1973 | Neuffer | 60/269 |
| 3,817,029 A | 6/1974 | Frisch | |
| 3,879,942 A * | 4/1975 | Dorn et al. | 60/245 |
| 4,002,120 A | 1/1977 | Swales | |
| 4,023,749 A | 5/1977 | McCorkle, Jr. | |
| 4,031,698 A | 6/1977 | Humphrey | |
| 4,050,243 A | 9/1977 | Holzman | |
| 4,085,909 A | 4/1978 | East et al. | |
| 4,124,976 A | 11/1978 | Holzman | |
| 4,131,246 A | 12/1978 | Rotmans | |
| 4,163,534 A | 8/1979 | Seeger | |
| 4,191,087 A | 3/1980 | Campbell | |
| 4,203,284 A * | 5/1980 | Luscan et al. | 60/245 |
| 4,277,940 A | 7/1981 | Harner | |
| 4,327,886 A | 5/1982 | Bell | |
| 4,432,512 A | 2/1984 | Young | |
| 4,441,312 A | 4/1984 | Smith | |
| 4,483,139 A | 11/1984 | Engl | |
| 4,628,688 A | 12/1986 | Keirsey | |
| 4,631,916 A | 12/1986 | Tanter | |
| 4,651,523 A | 3/1987 | Adams | |
| 4,745,861 A | 5/1988 | Fenton et al. | |
| 4,760,695 A | 8/1988 | Brown | |
| 4,826,104 A | 5/1989 | Bennett et al. | |
| 4,834,684 A | 5/1989 | Tallerino | |
| 4,844,380 A | 7/1989 | Peoples et al. | |
| 4,867,393 A | 9/1989 | Faupell et al. | |
| 4,913,379 A | 4/1990 | Kubota et al. | |
| 5,046,426 A | 9/1991 | Julian | |
| 5,074,492 A | 12/1991 | Morgand | |
| 5,112,007 A | 5/1992 | Buchele-Buecher | |
| 5,115,708 A | 5/1992 | Spariat | |
| 5,122,067 A | 6/1992 | Sunne | |
| 5,221,171 A | 6/1993 | Rudoy | |
| 5,224,344 A | 7/1993 | Keirsey | |
| 5,318,255 A | 6/1994 | Facciano | |
| 5,343,698 A | 9/1994 | Porter et al. | |
| 5,390,606 A | 2/1995 | Harris | |
| 5,456,425 A | 10/1995 | Morris et al. | |
| 5,505,408 A | 4/1996 | Speicher et al. | |
| 5,511,745 A | 4/1996 | Faupell et al. | |
| 5,537,815 A | 7/1996 | Marguet | |
| 5,544,586 A | 8/1996 | Huerta | |
| 5,662,290 A | 9/1997 | Voight | |
| 5,806,791 A | 9/1998 | Hatalsky | |
| 5,887,821 A | 3/1999 | Voight et al. | |
| 5,969,287 A | 10/1999 | Blain | |
| 6,058,846 A | 5/2000 | Boyd | |
| 6,142,425 A | 11/2000 | Armanios et al. | |
| 6,293,091 B1 | 9/2001 | Seymour | |
| 7,108,223 B2 * | 9/2006 | Chasman et al. | 244/3.22 |
| 7,127,994 B2 | 10/2006 | Cleveland | |
| 7,287,725 B2 | 10/2007 | Chasman et al. | |
| 2004/0084566 A1 | 5/2004 | Chasman | |
| 2005/0011989 A1 | 1/2005 | Chasman et al. | |
| 2006/0284006 A1 | 12/2006 | Chasman et al. | |

FOREIGN PATENT DOCUMENTS

| | | |
|---|---|---|
| DE | 1170284 | 5/1964 |
| DE | 3714425 | 11/1988 |
| FR | 1066499 | 6/1954 |
| FR | 1217708 | 5/1960 |
| GB | 293594 | 8/1928 |
| GB | 792831 | 4/1958 |
| GB | 2092271 | 8/1982 |
| WO | 2004044519 | 5/2004 |

* cited by examiner

HYBRID MISSILE PROPULSION SYSTEM WITH RECONFIGURABLE MULTINOZZLE GRID

BACKGROUND OF THE INVENTION

1. Technical Field of the Invention

The invention is in the field of propulsion systems for aircraft such as missiles.

2. Description of the Related Art

In missiles and other aircraft various types of propulsion systems have been utilized. Examples of propulsion systems include jets, ramjets, scramjets, and solid-fuel and liquid-fuel rocket motors. None of these systems is optimal in all areas of operation, such as specific impulse (propulsion density) total impulse, and time of operation. Hence tradeoffs have had to be made in selecting a propulsion system.

SUMMARY OF THE INVENTION

A reconfigurable multinozzle grid is used to satisfy different requirements for different modes of a hybrid propulsion system. The different modes, for example a solid rocket motor mode and a ramjet mode, have different requirements in terms of variables such as expansion ratio, operating pressure, operating temperature, burn time, exhaust products and nozzle erosion. Each system has optimum operation with different nozzle geometries. Whereas providing completely different nozzles for the solid rocket motor and the ramjet would result in weight inefficiencies and reduced performance, a reconfigurable multinozzle grid provides a simpler way of enabling the different nozzle geometries for the two modes. The multinozzle grid has a pair of plates which are separably coupled together. For operation of the solid rocket motor the grid is in a first configuration (with the plates coupled together) having a first nozzle geometry defined by both of the plates. After operation of the solid rocket motor has ceased, the grid is reconfigured by separating and jettisoning one of the plates, leaving the grid in a second configuration having a second nozzle geometry for the nozzles of the multinozzle grid.

According to an aspect of the invention, a multinozzle grid has a pair of plates separably mechanically coupled together. Nozzles of the multinozzle grid are initially defined by both of the plates.

According to another aspect of the invention a hybrid propulsion system has a solid rocket motor and a ramjet, both of which utilize a reconfigurable multinozzle grid.

According to yet another aspect of the invention, a multinozzle grid has a pair of plates coupled together at both of the coincident axes of the plates and along a perimeter of the plates.

According to a further aspect of the invention, a missile or other aircraft includes a hybrid propulsion system having a reconfigurable multinozzle grid.

According to a still further aspect of the invention, a method of operating a missile or other aircraft includes sending pressurized gas through a multinozzle grid in one mode of operation, reconfiguring the multinozzle grid for a second mode of operation, and sending pressurized gas through the reconfigured multinozzle grid, in a second mode of operation. According to a particular embodiment, the first mode of operation may be a solid rocket motor mode, and the second mode of operation may be a ramjet mode.

According to another aspect of the invention, a multinozzle grid includes: a forward plate; and an aft plate. The plates are separably mechanically coupled together. When the plates are mechanically coupled together, the plates define a plurality of converge-diverge nozzles each having a first configuration. When the plates are separated, the nozzles transform to a second configuration, different from the first configuration, with the nozzles defined by only one of the plates.

According to yet another aspect of the invention, a hybrid propulsion system includes: a solid rocket motor; a ramjet; and a reconfigurable multinozzle grid. The solid rocket motor and the ramjet both pass pressurized gas through a reconfigurable multinozzle grid.

According to still another aspect of the invention, a method of propelling a missile includes the steps of: passing first pressurized gas through a multinozzle grid that is in a first configuration, wherein the multinozzle grid includes a forward plate and an aft plate separably coupled together, wherein the forward plate and the aft plate together define a plurality of converge-diverge nozzles; separating the aft plate of the multinozzle grid from the forward plate of the mutlinozzle grid, thereby transforming the multinozzle grid from the first configuration to a second configuration with a plurality of modified converge-diverge nozzles defined only by the forward plate; and passing second pressurized gas through the multinozzle grid in the second configuration.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A propulsion system, such as for use in a missile, includes a multinozzle grid having a pair of plates that are separably mechanically coupled together. When coupled together in a first configuration, the plates provide multiple nozzles in a first nozzle configuration (geometry). Separation of the plates, such as by separating an aft plate from a forward plate that remains with the missile, reconfigures the multinozzle grid to a second configuration that has nozzles in a second nozzle configuration (geometry). The nozzle configurations may be suitable for different types of propulsion mechanisms. For example, the initial first configuration, with the plates coupled together, may be used as part of a solid rocket motor, while the second nozzle configuration, utilizing only one of the plates, may be used as part of a ramjet. The multinozzle grid may include a separation mechanism that initially mechanically couples the two plates together, and that can be used to jettison one of the plates, physically separating the plates. The coupling mechanism may include a severable band around the circumferences of the plates, and a central separation mechanism along axes of the plates. The hybrid propulsion system utilizing the multinozzle grid may include a pair of pressurized gas sources, for example a solid rocket fuel and a combustion chamber for a ramjet. The central separation mechanism for physically separating or pushing the plates away from one another may include a stack of Belleville washers that provide an axisymmetric force around the axes of the disc-shaped plates.

Figure 1:
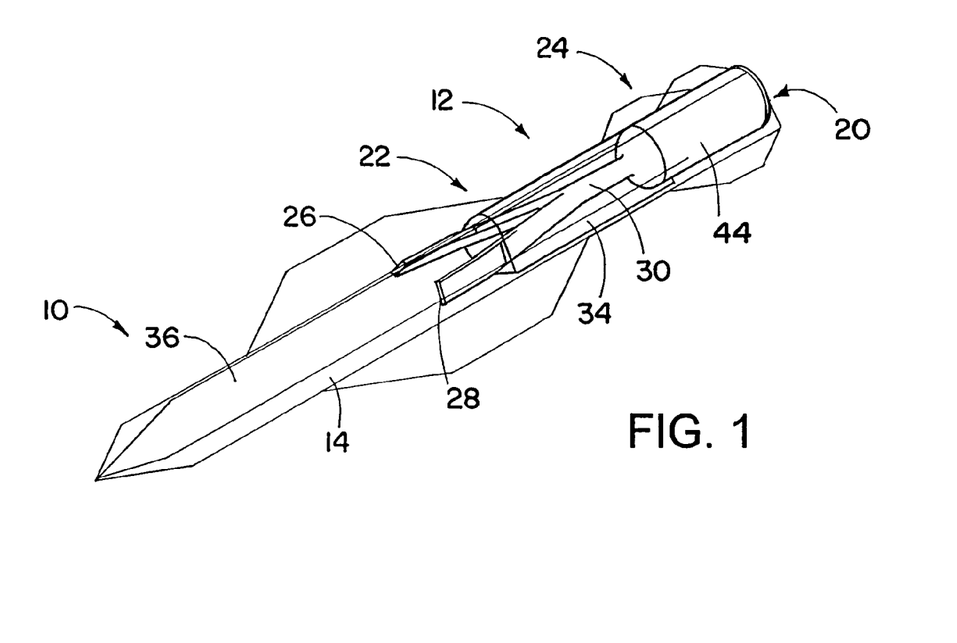
FIG. 1 is an orthogonal view of a missile in accordance with an embodiment of the invention.

Referring initially to FIG. 1, a missile 10 includes a propulsion system 12 at least partially within an airframe 14. The propulsion system 12 is a hybrid system that relies on two pressurized gas sources, both utilizing a multinozzle grid 20 at an aft end of the missiles airframe 14. The propulsion system 12 includes a ramjet 22 and a solid rocket motor 24. The ramjet 22 includes a pair of ramjet air inlets 26 and 28 that converge into an inlet duct 30. The ramjet 22 utilizes jet fuel that is stored within the airframe 14. The jet fuel 34 may be in separate tanks. Alternatively, the jet fuel 34 may be in a suitable space within a fuselage 36 of the airframe 14, such as between the inlet duct 30 and the fuselage 36. The fuselage 36 may thus be a "wet" fuselage.

It will be appreciated that the missile 10 may have a variety of other systems and structures, such as electronics (e.g., an avionics guidance computer), a payload such as a warhead, control mechanisms for targeting and guiding the missile 10, and a power system such as a battery.

Figure 2:
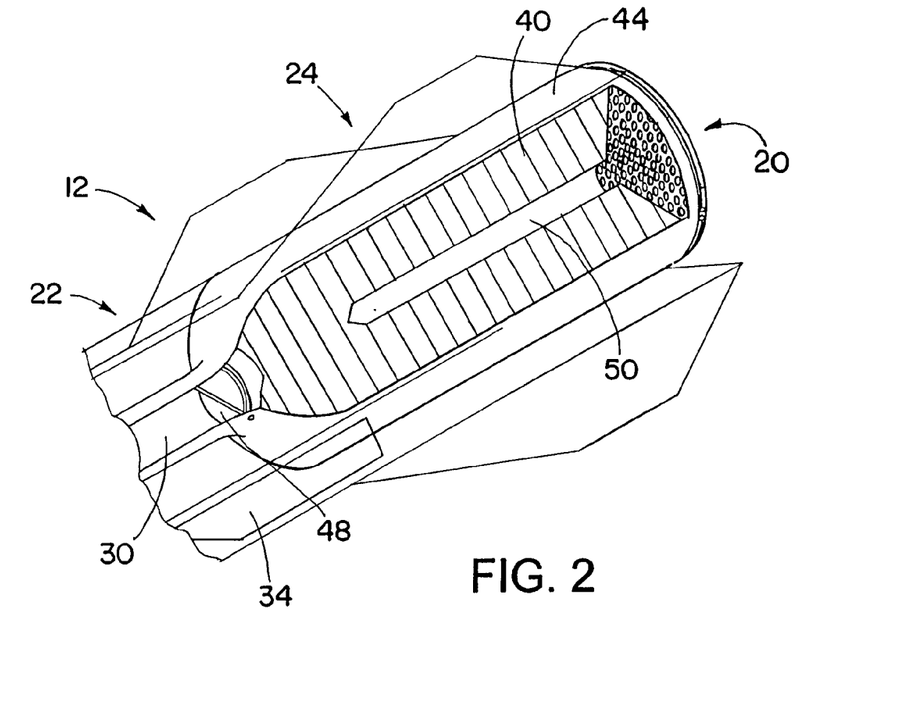
FIG. 2 is a cutaway orthogonal view showing some parts of the propulsion system of the missile of FIG. 1.

With reference now in addition to FIG. 2, the solid rocket motor 24 includes a solid propellant 40 that is inside a solid rocket motor case 44. A pressure door 48 at the forward portion of the solid rocket motor case 44 selectively closes a combustion chamber 50 inside the case 44 from the ramjet inlet duct 30, which joins the case 44 at the forward end of the case 44. After the solid rocket motor propellant 40 is completely expended the pressure door 48 automatically opens to allow flow of air from the inlet duct 30 into the combustion chamber 50, to enable operation of the ramjet. The multinozzle grid 20 is coupled to the aft end of the case 44.

Figure 3:
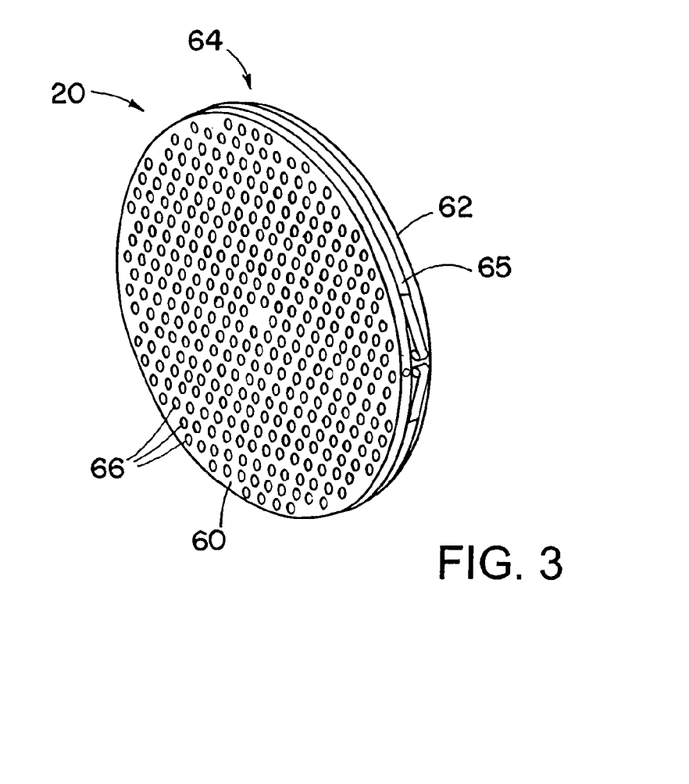
FIG. 3 is an orthogonal view showing the convergent side of a multinozzle grid of the propulsion system of the missile of FIG. 1.
Figure 4:
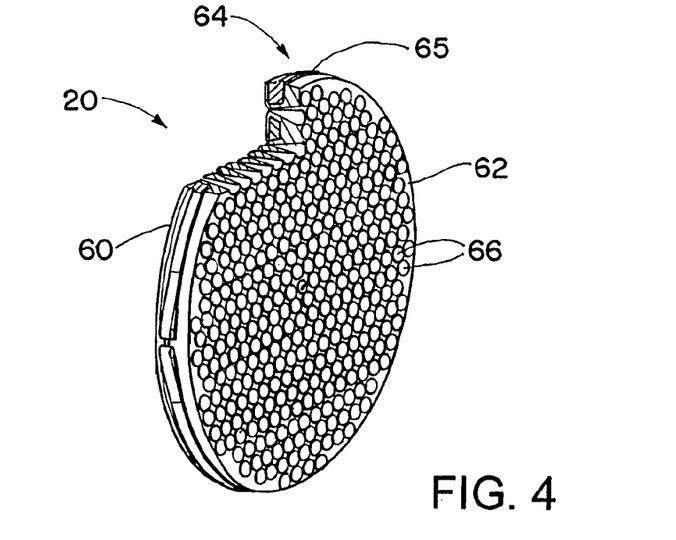
FIG. 4 is an orthogonal view showing a divergent side of the multinozzle grid of FIG. 3.

FIGS. 3 and 4 provide an overview of the configuration of the multinozzle grid 20. The multinozzle grid 20 includes a pair of circular-disc-shape plates 60 and 62. The plates 60 and 62 are separably mechanically coupled together, with the mechanisms for coupling and separating the plates described in greater detail below. The plates 60 and 62 together define a plurality of nozzles 66 in a first nozzle configuration. The nozzles 66 may fill substantially all of the major surfaces of the plates 60 ad 62, with the nozzles 66 closely packed together. Such an array of the nozzles 66 provides efficient use of the area of the plates 60 and 62 so as to provide a large amount of thrust for the available area. The forward plate 60 is on the convergent side of the multinozzle grid 20, and the aft plate 62 is on the divergent side of the multinozzle grid.

Referring now in addition to FIGS. 5-8, the forward plate 60 is attached to the aft end of the case 44 by any of a variety of suitable attachment mechanisms. A forward plate 60 may be molded into the solid rocket motor case 44, may be bonded to the case 44, or may be bolted or otherwise mechanically fastened to the case 44. The aft plate 62 is not directly coupled to the solid rocket motor case 44 or to the airframe 14. The aft plate 62 is only separably mechanically coupled to the forward plate 60. The plates 60 and 62 are held together by a plate connection or coupling mechanism 64 that includes a severable band 65.

Figure 5:
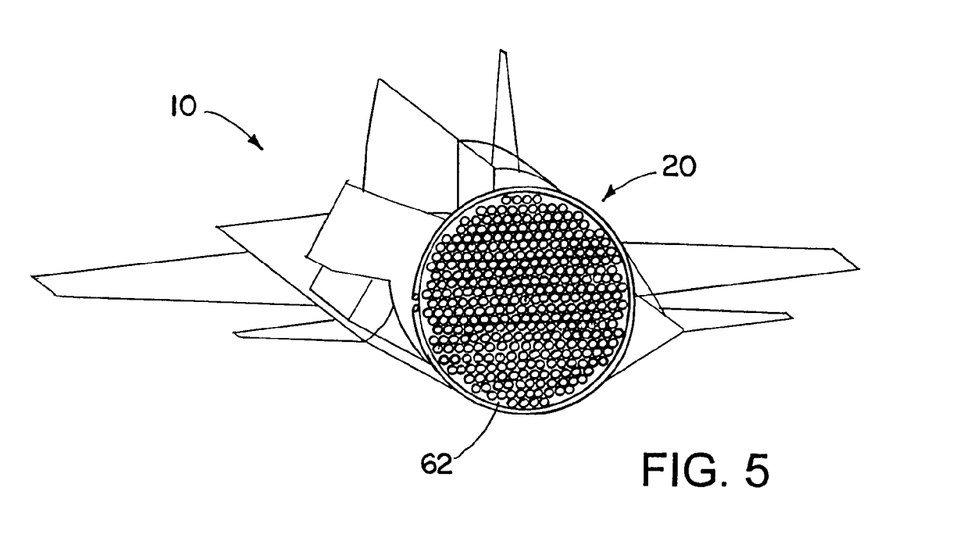
FIG. 5 is a view from the rear of the missile of FIG. 1, showing the multinozzle grid in a first configuration, with the plates of the multinozzle grid coupled together.
Figure 6:
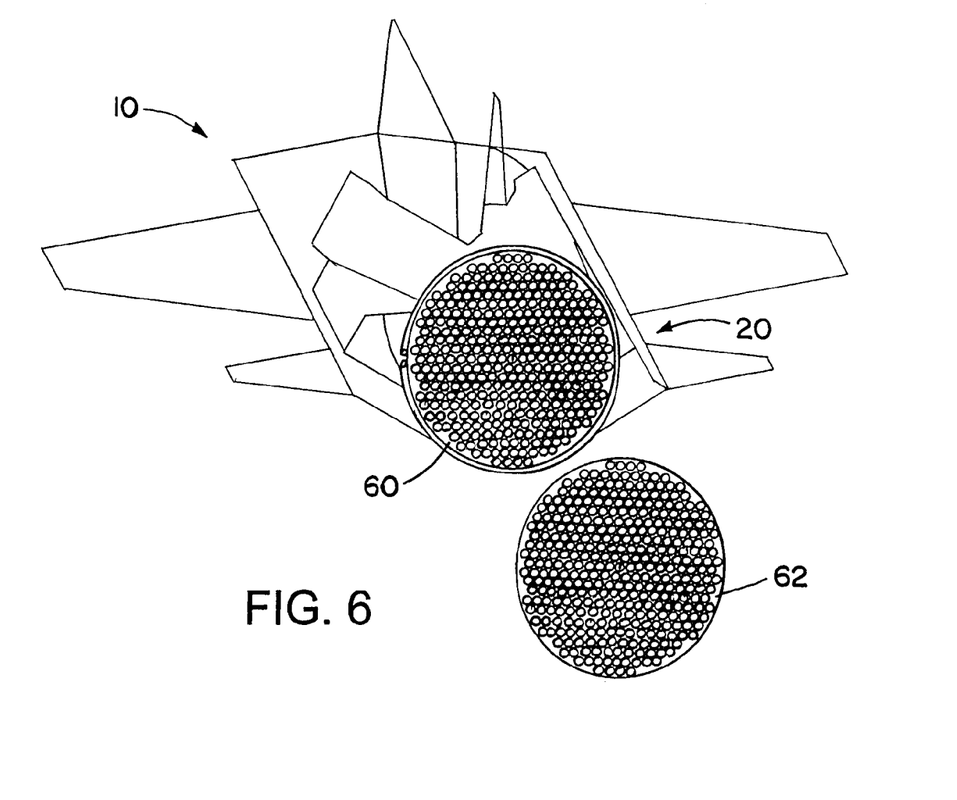
FIG. 6 shows the multinozzle in a second configuration, with the aft plate of the multinozzle grid separated and ejected from the missile.
Figure 7:
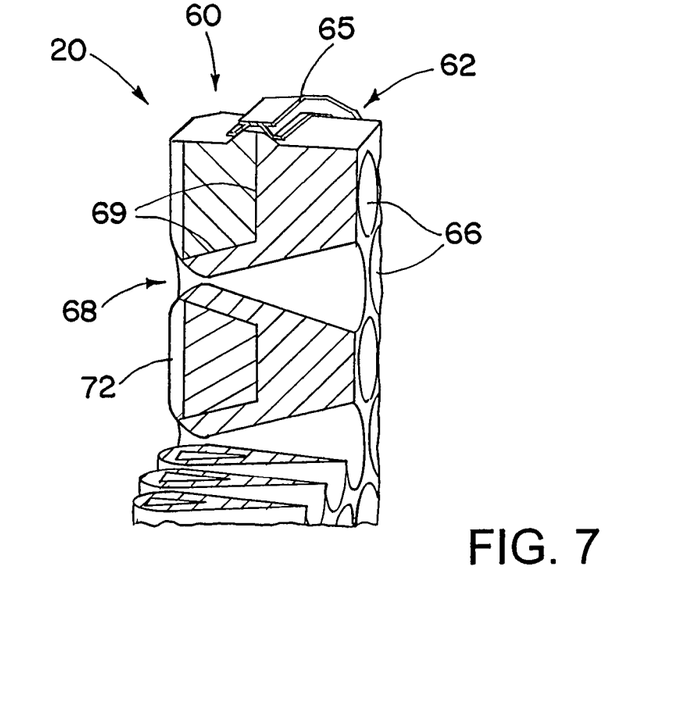
FIG. 7 is a sectional view showing a first nozzle geometry configuration of the multinozzle grid, with the multinozzle grid it its first configuration.
Figure 8:
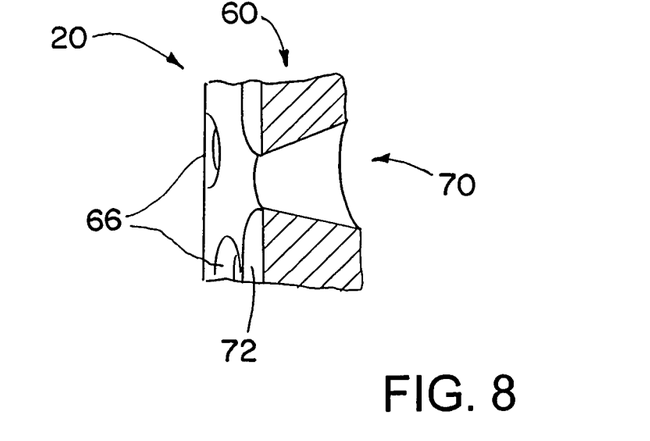
FIG. 8 shows the nozzle geometry configuration with the multinozzle grid in its second configuration.

When the plates are coupled together in a first configuration 68, shown in FIGS. 5 and 7, the nozzles 66 defined by the plates have a first configuration. A second configuration may be obtained by separating the aft plate 62 from the forward plate 60 along a parting line 69, shown in FIGS. 6 and 8. In the second configuration of the multinozzle grid 20 the nozzles 66 are transformed from the first nozzle configuration 68 to a second nozzle configuration 70. While the first nozzle configuration 68 is defined by surfaces of both of the plates 60 and 62, the second nozzle configuration 70 is defined only by the forward plate 60. This is because the aft plate 62 has been fully physically separated from the forward plate 60, such that the aft plate 62 in no longer part of the missile 10, and no longer plays any part in operation of the missile 10. The second nozzle configuration 70 has a wider throat than the first nozzle configuration 68. In addition, the second nozzle configuration 70 has a shorter length than the first nozzle configuration 68. It will be appreciated that there may be other differences between the geometries of the nozzle configurations 68 and 70 that correspond to different configurations of the multinozzle grid 20. The first nozzle configuration 68 may be configured for one mode of operation of the hybrid propulsion system 12, and the second nozzle configuration 70 may be configured for operation in a second mode or mechanism used by the hybrid propulsion system 12. In the illustrated embodiment, the multinozzle grid 20 has a first configuration (with the plates 60 and 62 coupled together and with the nozzles 66 and the first nozzle configuration 68) for operation of the solid rocket motor 24. The multinozzle grid 20 is in a second configuration (with the plates 60 and 62 separated, and with the nozzles 66 in the second configuration, utilizing only the forward plate 60) for operation of the ramjet 22. However, it will be appreciated that different multinozzle grid configurations may be used for other types of propulsion mechanisms, such as a turbojet or a scramjet. Another alternative would be to use two different nozzle configurations for different types of solid rocket motors.

The plates 60 and 62 may be made of any of a variety of suitable materials, for example including high-temperature resistance composite materials or suitable metal materials, such as steel, aluminum, or titanium. The forward plate 60 may have a layer of face insulation material 72, such as a phenolic material, on its forward surface.

The multinozzle grid 20 may advantageously be optimized for the two types of propulsion mechanisms included in the hybrid propulsion system 12 (FIG. 1). The first nozzle configuration 68 may be optimally configured for use as part of the solid rocket motor 24, and the second nozzle configuration 70 may be optimally configured for use as part of the ramjet 22. The nozzle configurations 68 and 70 may have different optimal configurations because of the different pressure ratios and/or temperature ratios for solid rocket motor and ramjet operations. Further details regarding how nozzles are configured may be found in U.S. Pat. No. 7,108,223, and in U.S. Patent Pub. No. 2004/0084566 A1, the descriptions and drawings of which are hereby incorporated by reference.

It will be appreciated that the propulsion system 12 described herein may be used for a wide variety of different types of aircraft. Although the aircraft is shown and described as a missile, it will be appreciated that the missile 10 may have many characteristics resembling those of an airplane. For example a missile 10 may have features such as wings and a tail that are normally associated with airplanes.

Figure 9:
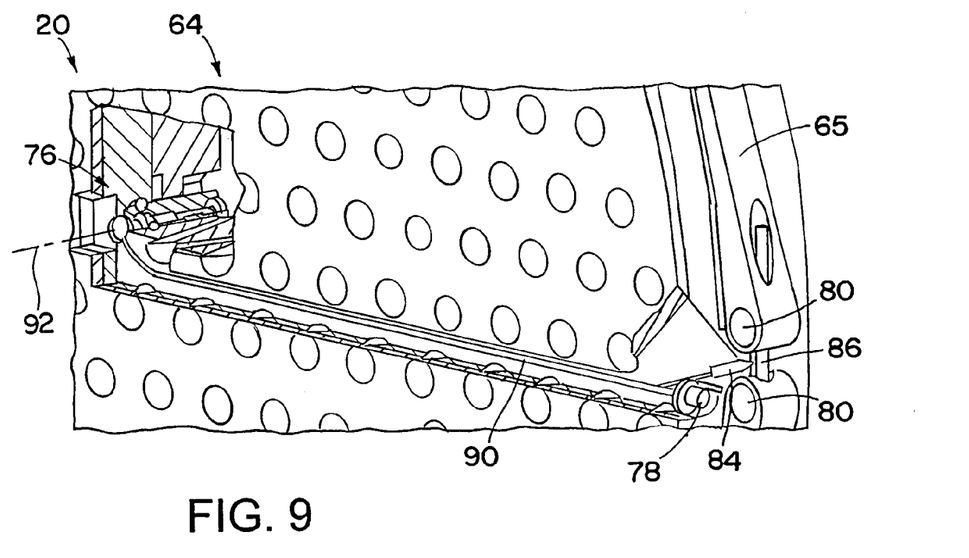
FIG. 9 is a view of part of the multinozzle grid, showing aspects of the mechanical coupling between the plates of the multinozzle grid.
Figure 10:
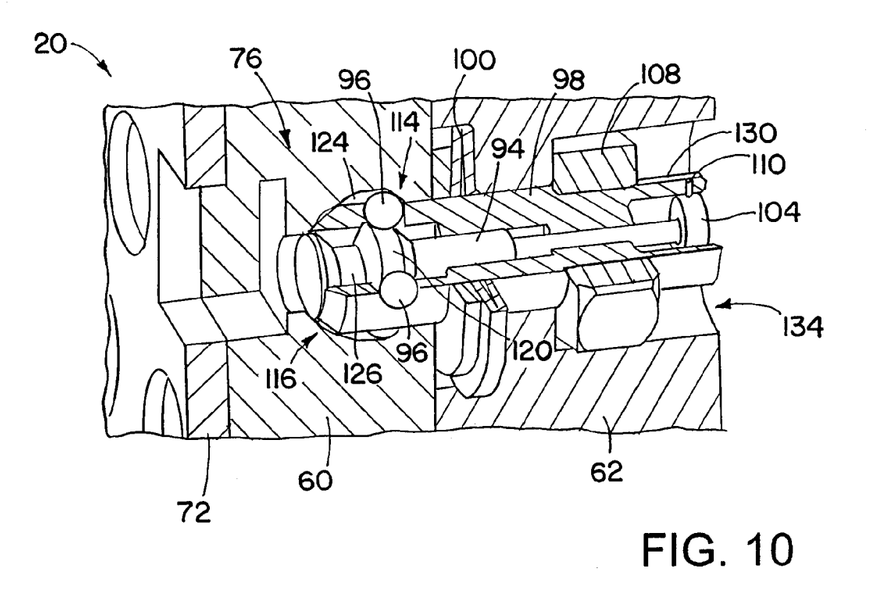
FIG. 10 is a partially cutaway orthogonal view showing components of a central separation mechanism separably coupling the plates of the multinozzle grid.

With reference now to FIGS. 9 and 10, further details are now described with regard to the plate connection or coupling mechanism 64. The coupling mechanism 64 includes the severable band 65, a central coupling mechanism 76, and a pyrotechnic device such as a squib 78. The squib 78 is used to cause decoupling of the plates 60 and 62. Tension bolts 80 are used to put a desired tension on the severable band 65. The squib 78 activates mechanisms to release both the band 65 and the central coupling mechanism 76. With regard to the band 65, pressure from expanding gases resulting from detonation of the squib 78 drive a bolt cutter 84 into a severable portion 86 of the severable band 65. This causes the severable band portion 86 to break releasing the severable band 65 from its position clamped around the perimeter or circumference of the plates 60 and 62.

Pressurized gases from detonation of the squib 78 are also used to release the central separation or coupling mechanism 76. A tube 90 within one of the plates 60 and 62 may be used as a gas path for taking high-pressure gases from the squib 78, which is located along the perimeter of the plates 60 and 62, to the central location of the separation mechanism 76, along the coincident axes 92 of the plates 60 and 62.

The central separation mechanism 76 includes a detent pin 94, a series of locking balls 96, a shaft 98, a pair of initially-loaded Belleville washers 100, a plunger 104, a preload nut 108, and a sheer pin 110 on the plunger 104. The locking balls 96 protrude through holes 114 in the shaft 98, and a detent pin 94 is inserted into a hollow central opening 116 in the shaft 98. In the initial configuration of the central separation mechanism 76, with the plates 60 and 62 coupled together, a widened portion 120 of the detent pin 94 presses outward against the locking balls 96. This keeps the locking balls 96 (and therefore part of the mechanism 76) within a recess 124 in the forward plate 60. The detent pin 94 also has a narrower portion 126 that allows the locking balls 96 to move inward, out of engagement with the walls of the forward plate recess 124, when the detent pin 94 is inserted further into the shaft opening 116.

The stack of Belleville washers 100 is placed between the plates 60 and 62. The washers 100 are preloaded, and provide a force for pushing the plates 60 and 62 apart from one another when the plates 60 and 62 are no longer held together by the mechanism 76.

The plunger 104 is inserted into the opposite end of the shaft opening 116 from the detent pin 94. The plunger 104 is in contact with or is attached to the detent pin 94. The sheer pin 110 is used to hold the plunger 104 in place prior to activation of the separation mechanism 76. The preload nut 108 is threaded along a threaded outer surface 130 of the shaft 98. The preload nut 108 is tightened enough within an aft plate recess 134 to provide the desired preloading to the Belleville washers 100.

Figure 11:
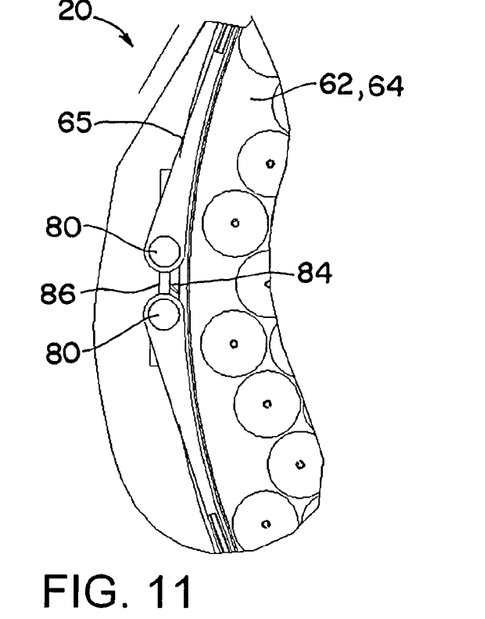
FIG. 11 is a plan view showing the coupling of the plates of the multinozzle grid along the circumference or perimeter of the plates.
Figure 12:
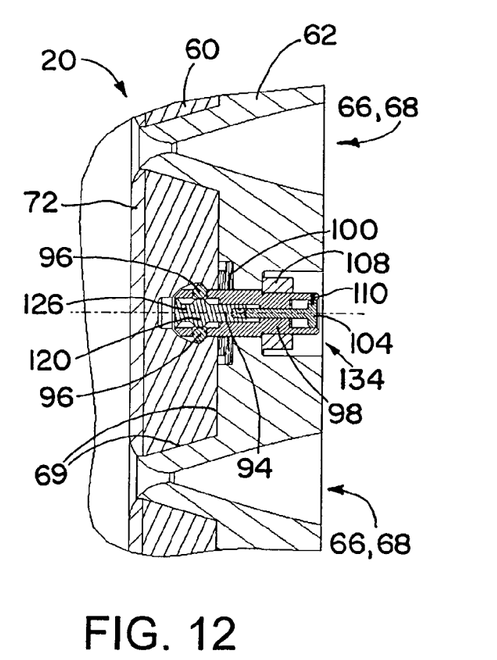
FIG. 12 is a sectional view showing the central coupling between the plates of the multinozzle grid at the coincident axis of the plates.
Figure 13:
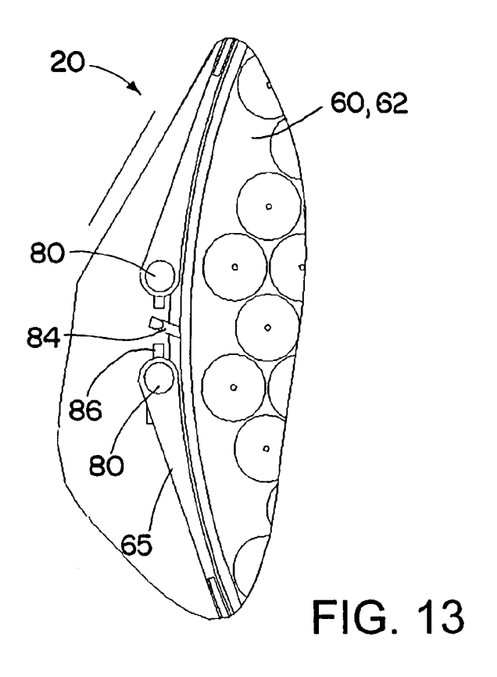
FIG. 13 is a plan view, the same as FIG. 11, showing severing of the band coupling the plates along their circumferences.
Figure 14:
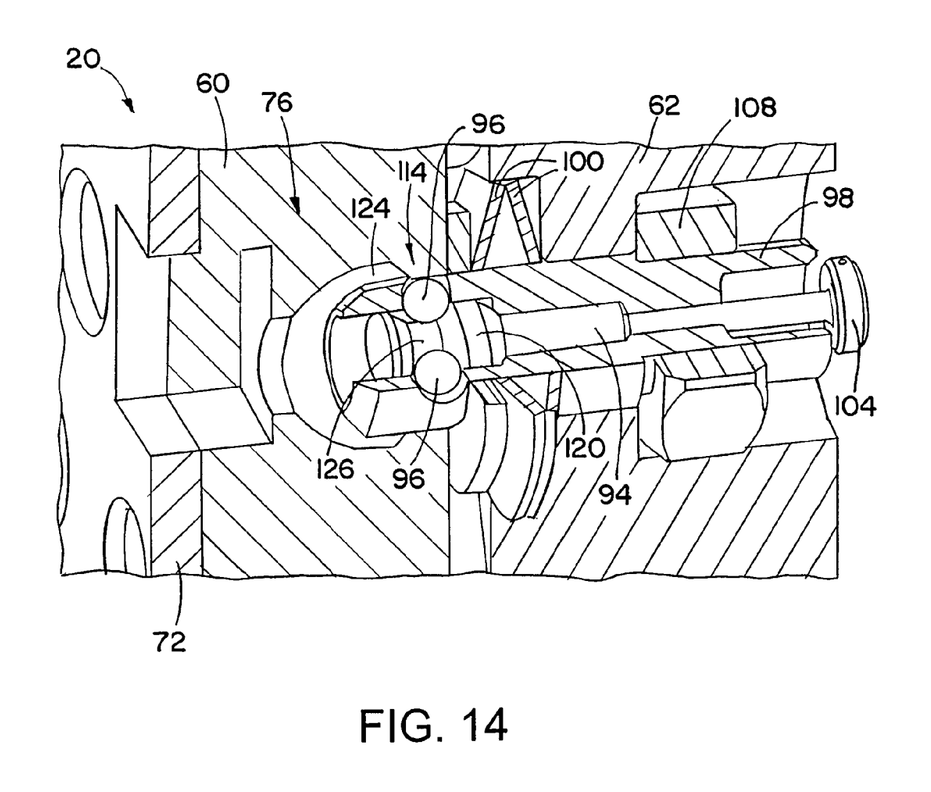
FIG. 14 is a partially cutaway orthogonal view illustrating operation of the central separation mechanism separably coupling the plates of the multinozzle grid.
Figure 15:
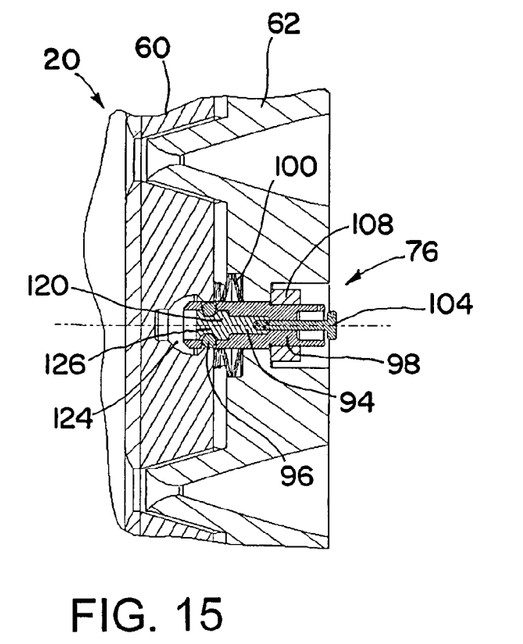
FIG. 15 is a sectional view illustrating the separation along the axes of the multinozzle grid.

FIGS. 11-17 illustrate the activation of the separation mechanism 76, to separate the aft plate 62 from the forward plate 60. FIGS. 11 and 12 show the configuration of the components of the separation mechanism prior to detonation of the squib 78 (FIG. 9). Once the squib 78 is detonated, pressurized gases from the squib 78 drive the bolt cutter 84 into the severable portion 86 of the band 65, as shown in FIG. 13. The severing of the portion 86 releases tension on the band 65, and causes the band to separate from the perimeter of the plate 60 and 62. At the same time as illustrated in FIGS. 14 and 15 gases from the squib 78 press down along the detent pin 94, driving the pin further into the shaft opening 116. This also moves the plunger 104 in the same direction, since the plunger is in contact with or attached to the detent pin 94. This movement of the plunger 104 sheers off the sheer pin 110. The movement of the detent pin 94 into the shaft 98 causes the narrower portion 126 of the pin 94 to come into alignment with the locking balls 96. Pressure from the wall of the forward plate recess 124 presses the locking balls 94 inward, into engagement with the recess around the detent pin portion 126. In other words, movement of the detent pin 94 allows unlocking of the locking balls 96, which in turn allows disengagement of the shaft 98 from the forward plate recess 124. The inward movement of the locking balls 96 allows disengagement from the forward plate 60 of the shaft 98, and of all other portions of the separation mechanism 76. Thus separation of the plates 60 and 62 is no longer prevented by the action of the locking balls 96 (or any other part of the central separation mechanism 76. At this point the preloaded forces on the Belleville washers 100 act to press outward against both of the plates 60 and 62. This causes separation of the plates 60 and 62. The beginning of this process may be seen in FIG. 15, which shows the aft plate 62 slightly separated from the forward plate 60.

Figure 16:
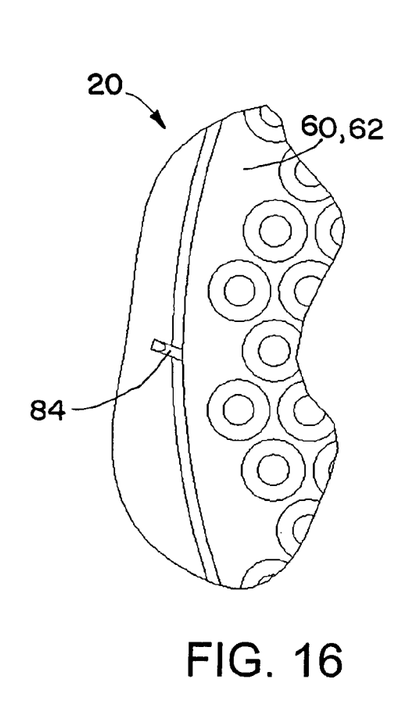
FIG. 16 is the same view as that of FIGS. 11 and 13, showing full separation of the plates.
Figure 17:
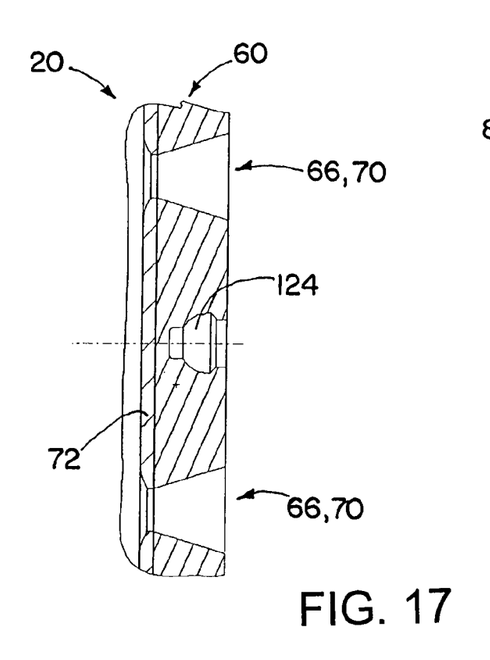
FIG. 17 is a sectional view showing the remaining forward plate of the multinozzle grid, which remains coupled to the missile after separation of the aft plate.

FIGS. 16 and 17 show the conclusion of the separation process, with the aft plate 62 no longer in the vicinity of the forward plate 60. The aft plate 62 separates fully from the missile 10 (FIG. 1), while the forward plate 60 remains attached to the rest of the missile 10.

The missile 10 (FIG. 1) may be configured to automatically fire the squib 78 when the solid rocket motor propellant 40 has been substantially consumed. This may be done based on signal from a pressure transducer in the solid rocket motor 24, or may be done when a pressure sensor in the inlet duct 30 or a potentiometer on the axis of the pressure door 48 indicates that the pressure door 48 is flowing and that air is flowing from the ramjet inlets 26 and 28 through the inlet duct 30 and into the combustion chamber 50. The cessation of solid rocket motor operation is also the trigger for injection of jet fuel into the inlet duct 30, and for the ignition of the fuel-air mixture to start ramjet operation.

Figures 18, 19, 20:
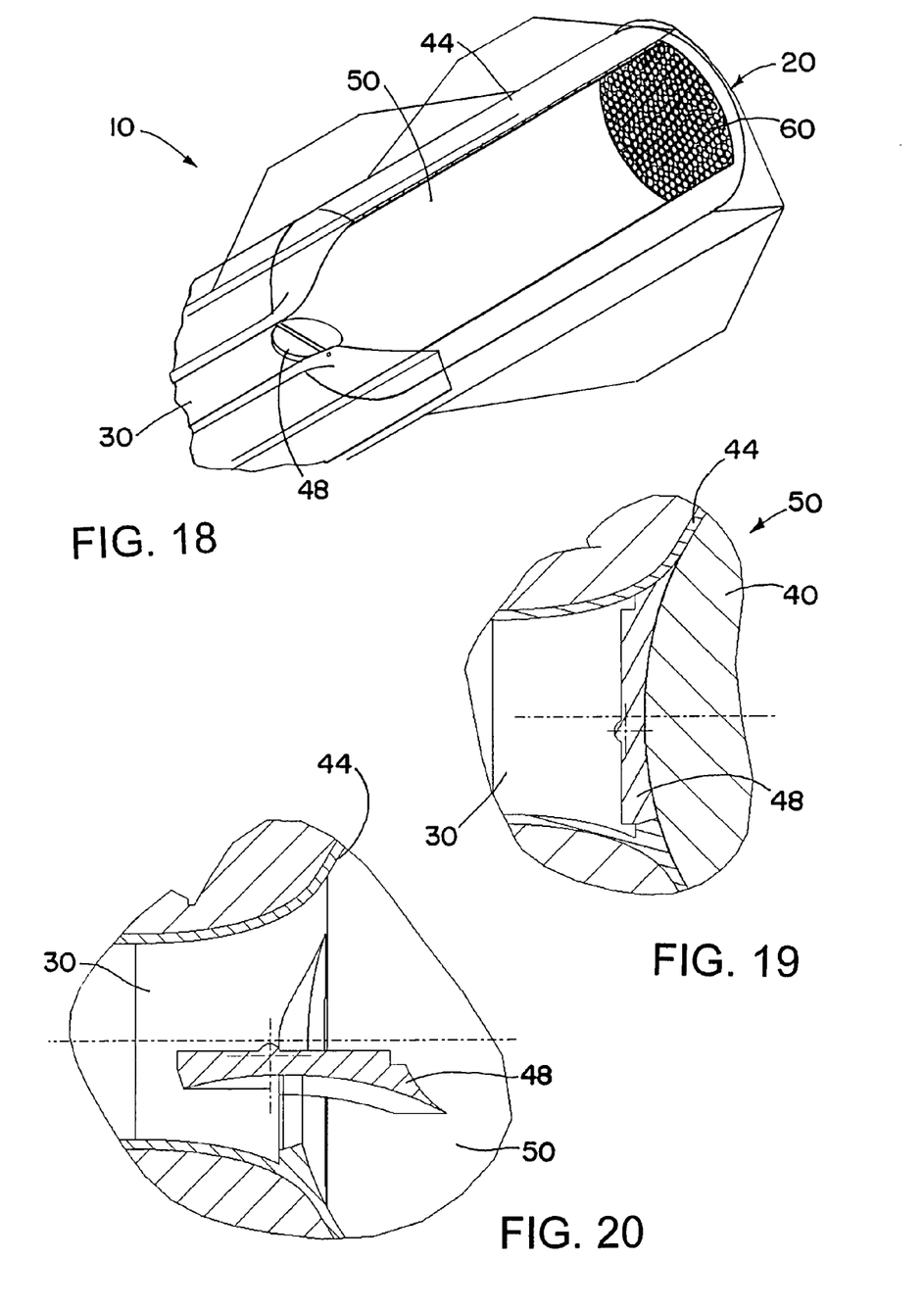
FIG. 18 is a partially cutaway orthogonal view illustrating operation of the propulsion system of the missile of FIG. 1 in ramjet mode.
FIG. 19 is a sectional view showing parts of the propulsion system of the missile of FIG. 1, with a pressure door of the propulsion system in a closed position.
FIG. 20 is a sectional view showing the pressure door of FIG. 19 in an open position.

Turning now to FIGS. 18-20, the pressure door 48 is shown in its initial closed position (FIG. 19), and in its open position (FIG. 20). During operation of the solid rocket motor 24 (FIG. 1) the high pressure within the combustion chamber 50 keeps the pressure door 48 closed. Once the propellant 40 has been substantially consumed, pressure within the combustion chamber 50 drops. The pressure door 48 is balanced on an off center hinge 140, such that when pressure in the inlet duct 30 exceeds the pressure in the solid rocket motor combustion chamber 50, the pressure door 48 automatically opens to allow inlet of air from the ramjet inlets 26 and 28 (FIG. 1), for operation of the propulsion system 12 (FIG. 1) in its ramjet mode.

The multinozzle grid 20 advantageously allows optimized nozzle configurations for multiple modes of operation of the hybrid propulsion system 12. Use of the separable plates 60 and 62 of the multinozzle grid 20 enables a pair of configurations for the multinozzle grid 20, each of which has nozzles configured for optimum operation of one of the modes of the hybrid propulsion system 12, for example the solid rocket motor and ramjet modes described above. A single pyrotechnic device (the squib 78) is advantageously used to accomplish separation of the aft plate 62, by simultaneously disengaging central and circumferential mechanical couplings of the plate coupling mechanism 64. An additional advantage is that the jettisoning of the aft plate 62 reduces weight of the missile 60, reducing power requirements for achieving a given level of performance.

The hybrid propulsion system 12 advantageously combines rapid acceleration with efficient, long-range cruise capability. The solid rocket motor 24 allows the missile 10 to accelerate rapidly and to perhaps gain initial altitude. After cessation of operation of the solid rocket motor 24, the ramjet 22 provides a highly efficient propulsion system for long-range cruising. The use of the reconfigurable multinozzle grid 20 advantageously solves the problem of having nozzles that are configured for the individual solid rocket motor and ramjet modes of operation. The result is the capability to have an aircraft that combines both speed and range.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hybrid propulsion system comprising:
   a solid rocket motor;
   a ramjet; and
   a reconfigurable multinozzle grid;
   wherein the solid rocket motor and the ramjet both pass pressurized gas through the reconfigurable multinozzle grid;
   wherein the multinozzle grid includes:
      a forward plate; and
      an aft plate;
   wherein the plates are separably mechanically coupled together;
   wherein, when the plates are mechanically coupled together, the plates define a plurality of converge-diverge nozzles each having a first configuration;
   wherein, when the plates are separated, the nozzles transform to a second configuration, different from the first configuration, with the nozzles defined by only one of the plates; and
   wherein the multinozzle grid is configured to change from the first configuration to the second configuration during operation of the propulsion system, such that 1) the multinozzle grid is in the first configuration when pressurized gasses from the solid rocket motor pass through the multinozzle grid, and 2) the multinozzle grid is in the second configuration when pressurized gasses from the ramjet pass through the multinozzle grid.

2. The propulsion system of claim 1,
   wherein the solid rocket motor includes:
      a case; and
      a solid propellant in a combustion chamber enclosed by the case;
   wherein the mutlinozzle grid is attached to an aft end of the case; and
   wherein the ramjet includes an inlet duct attached to a forward end of the case.

3. The propulsion system of claim 2, further comprising a pressure door that selectively allows airflow from the inlet duct to the combustion chamber.

4. The propulsion system of claim 3, wherein the pressure door hinges off of a center line of the pressure door, thereby automatically opening when pressure in the inlet duct exceeds pressure in the combustion chamber.

5. The propulsion system of claim 1, wherein the plates are both circular disks.

6. The propulsion system of claim 1, wherein further comprising a coupling mechanism separably coupling the plates together.

7. The propulsion system of claim 6, wherein the coupling mechanism includes a separation mechanism for separating the plates.

8. The propulsion system of claim 6, wherein the coupling mechanism includes a severable band around perimeters of the plates.

9. The propulsion system of claim 1, wherein the plates are separably mechanically coupled together by a coupling mechanism separably coupling the plates together; and
   wherein the coupling mechanism includes a separation mechanism separably joining central axes of the disks, for separating the plates of the multinozzle grid as the multinozzle grid changes from the first configuration to the second configuration during operation of the propulsion system.

10. A hybrid propulsion system comprising:
    a solid rocket motor;
    a ramjet; and
    a reconfigurable multinozzle grid;

wherein the solid rocket motor and the ramjet both pass pressurized gas through the reconfigurable multinozzle grid;

wherein the multinozzle grid includes:
   a first plate; and
   a second plate;

wherein the plates are separably mechanically coupled together by a coupling mechanism separably coupling the plates together;

wherein, when the plates are mechanically coupled together, the plates define a plurality of converge-diverge nozzles each having a first configuration; and wherein, when the plates are separated, the nozzles transform to a second configuration, different from the first configuration, with the nozzles defined by only one of the plates; and wherein the coupling mechanism allows separation of the plates during operation of the propulsion system.

11. The propulsion system of claim 10,
wherein the plates are both circular disks; and
wherein the coupling mechanism includes a separation mechanism separably joining central axes of the disks.

12. The propulsion system of claim 10,
wherein the plates are both circular disks; and
wherein the coupling mechanism includes a severable band around circumferences of the disks.

13. The propulsion system of claim 10, wherein the coupling mechanism includes a pyrotechnic device used to initiate separation of the plates.

14. The propulsion system of claim 10,
wherein the solid rocket motor includes:
   a case; and
   a solid propellant in a combustion chamber enclosed by the case;

wherein the mutlinozzle grid is attached to an aft end of the case; and
wherein the ramjet includes an inlet duct attached to a forward end of the case.

15. The propulsion system of claim 14, further comprising a pressure door that selectively allows airflow from the inlet duct to the combustion chamber.

16. The propulsion system of claim 15, wherein the pressure door hinges off of a center line of the pressure door, thereby automatically opening when pressure in the inlet duct exceeds pressure in the combustion chamber.

17. A hybrid propulsion system comprising:
a solid rocket motor;
a ramjet; and
a reconfigurable multinozzle grid;
wherein the solid rocket motor and the ramjet both pass pressurized gas through the reconfigurable multinozzle grid;
wherein the multinozzle grid includes:
   a forward plate; and
   an aft plate;
wherein the plates are separably mechanically coupled together;
wherein, when the plates are mechanically coupled together, the plates define a plurality of converge-diverge nozzles each having a first configuration;
wherein, when the plates are separated, the nozzles transform to a second configuration, different from the first configuration, with the nozzles defined by only one of the plates; and
wherein the second configuration includes the nozzles having wider openings than in the first configuration.

18. The propulsion system of claim 17, wherein the plates are both circular disks.

\* \* \* \* \*